June 13, 1944.  D. E. IRONS  2,351,431
SHAFT BEARING
Filed May 16, 1942

Inventor:
Davison E. Irons,
by Harry E. Dunham
His Attorney.

Patented June 13, 1944

2,351,431

UNITED STATES PATENT OFFICE 2,351,431

SHAFT BEARING

Davison E. Irons, Erie, Pa., assignor to General Electric Company, a corporation of New York Application May 16, 1942, Serial No. 443,189

1 Claim. (Cl. 308—127)

The present invention relates to shaft bearings which are oil-lubricated and have a circumferentially extended groove in the bearing surface with a dam in the unloaded region to cause the building up of pressure. With such arrangement a shaft supported on the bearing is forced by the oil pressure built up near the dam towards the loaded region and whipping, whirling and like vibratory movements of the shaft are thereby substantially reduced. An arrangement of this kind is disclosed in the patent to L. P. Gobel et al. 1,940,301, issued December 19, 1933, and assigned to the same assignee as the present application. The pressure developed in the unloaded region of such bearing depends upon the depth of the circumferential groove and the clearance between the shaft and the dam. If the bearing clearance is too great initially, the pressure may be insufficient to stabilize the bearing. Also, the stabilizing pressure may decrease during operation due to wear of the bearing and the consequent increased clearance between the dam and the shaft so that the shaft may gradually start to vibrate.

The object of my invention is to provide an improved construction and arrangement of shaft bearings of the type specified above whereby the clearance between the dam and the shaft may be adjusted initially as well as during operation and a constant stabilizing effect assured thereby.

This is accomplished in accordance with my invention by a bearing which has a circumferential groove or grooves in its bearing surface and an adjustable dam projecting into the groove in the unloaded region, that is, opposite the load-carrying region. Such dam may be biased in the direction of the shaft by means of a spring or hydraulically. The oil pressure built up by the pumping action of the shaft near the dam may be utilized to force the latter towards the shaft.

For a better understanding of what I believe to be novel and my invention, attention is directed to the following description and the claim appended thereto in connection with the accompanying drawing.

Figure 1:
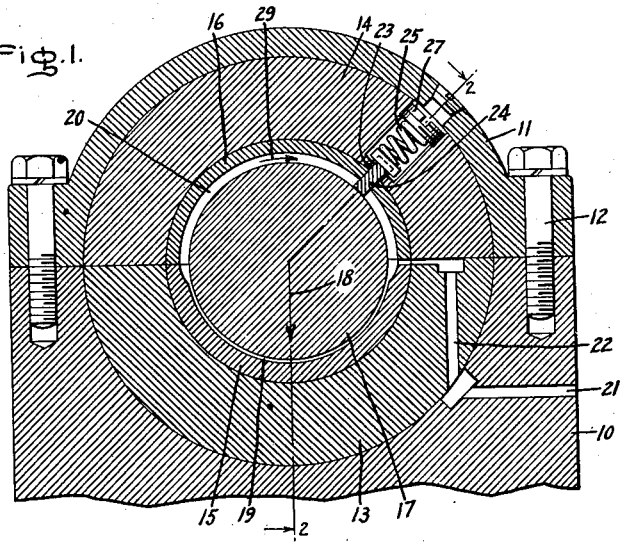
Figure 2:
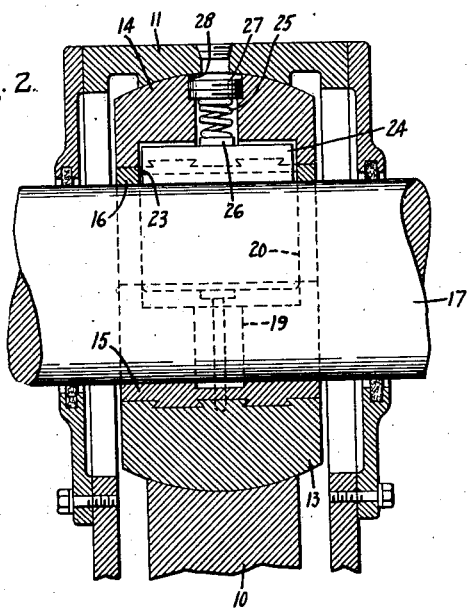
Figure 3:
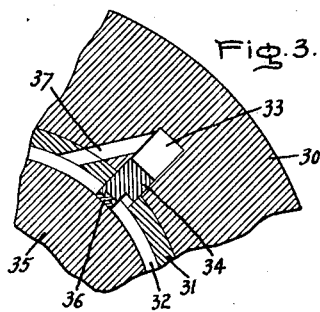

In the drawing Fig. 1 illustrates a sectional view of a bearing embodying my invention; Fig. 2 is a section along line 2—2 of Fig. 1, and Fig. 3 is a modification of my invention.

The bearing arrangement of Figs. 1 and 2 comprises a housing having a lower half 10 and an upper half 11 fastened together by bolts 12. A backing having a lower half 13 and an upper half 14 is supported in known manner on the housing 10 and 11. The two halves 13, 14 of the backing are provided with bearing linings 15 and 16 respectively which form a bearing surface for supporting a shaft 17. The bearing shown is intended to be loaded in a vertically downward direction as indicated by an arrow 18.

In order to provide for substantially complete film lubrication and to assure stable operation of the shaft 17, means are provided to conduct lubricant to the bearing surface and to produce a stabilizing force in direction of the bearing load by building up hydraulic pressure in the upper or unloaded region of the bearing surface. The lower bearing lining 15 in the present example has a centrally located, comparatively narrow and shallow groove 19 while the upper bearing lining 16 is formed with a circumferentially extending deep groove 20 extending over a major portion of the axial length of the bearing (Fig. 2). Lubricant is conducted to the bearing surface through channels 21 and 22 formed in the housing and the backing and terminating near the horizontal plane through the center of the shaft. The backing 14 and the upper lining 16 have a radial slot 23 of an axial length about equal to the axial length of the groove 20. A bar or like dam-forming member 24 is slidably disposed in the slot 23 and biased radially inward towards the center of the shaft by a compression spring 25 engaging at its inner end a knob 26 secured to the bar 24 and at its outer end an adjustable plug 27 screwed into a cylindrical recess 28 of the backing 14.

During operation with the shaft rotating in clockwise direction, as indicated by an arrow 29, oil or like lubricant supplied to the bearing is forced by the pumping action of the shaft along the circumferential grooves 19 and 20 building up pressure near the dam 24 whereby the shaft is forced downward towards the load-carrying region. The oil leaking axially along the bearing lining is discharged from the ends thereof. If during operation the face of the dam adjacent the shaft is worn, the spring pressure may be increased by tightening the plug 27 in order to maintain substantially constant oil pressure in the unloaded region of the bearing. The plug 27 may also be tightened if for some other reason it may become desirable to increase the stabilizing force of the oil pressure built up in the unloaded region.

The arrangement of Fig. 3 comprises a backing 30 with a bearing lining 31 forming an axially wide and radially deep groove 32 in the unloaded region of the bearing corresponding to the groove 20 of Fig. 1. The backing 30 and the lining 31 form a radial slot 33 for accommodating a dam-forming member 34 slidably disposed therein and projecting into the groove 32 in order to reduce whipping or whirling of a shaft 35 supported on the bearing. The member 34 in this example has a face provided with a lining 36 of bearing metal adjacent the shaft 35. In addition the arrangement includes hydraulic means to bias the member 34 towards the shaft. To this end a channel 37 connects the outer end of the slot 33 with the groove 32 at a point ahead of the dam 34 as regards the direction of rotation of the shaft. During operation oil pressure built up in the groove 32 ahead of the dam is transmitted to the inner part of the slot 33 and thereby biases the member 34 radially towards the shaft 35. An arrangement of this kind is substantially unaffected by wear of the inner face of the dam-forming member 34.

Having described the method of operation of my invention, together with the apparatus which I now consider to represent the best embodiment thereof, I desire to have it understood that the apparatus shown is only illustrative and that the invention may be carried out by other means.

What I claim as new and desire to secure by Letters Patent of the United States, is:

A bearing having a bearing surface with an annular groove and a channel for conducting lubricant to the groove, the bearing having an axially extending slot communicating with the groove and of an axial length substantially equal to that of the groove, a dam-forming member slidable in the slot projecting into the groove, and hydraulic means for biasing the member into the groove, said hydraulic means including a channel connecting the outer end of the slot with the groove ahead of the dam as regards the direction of rotation of a shaft to be supported on the bearing.

DAVISON E. IRONS.